United States Patent [19]

Keller et al.

[11] Patent Number: 4,521,356

[45] Date of Patent: Jun. 4, 1985

[54] DECORATIVE FLATWARE HANDLES AND PROCESS FOR THEIR PREPARATION

[75] Inventors: Hartmut Keller; Axel Krauth; Roswitha Kreiner, all of Selb, Fed. Rep. of Germany

[73] Assignee: Rosenthal Aktiengesellschaft, Selb, Fed. Rep. of Germany

[21] Appl. No.: 379,006

[22] Filed: May 17, 1982

[30] Foreign Application Priority Data

May 21, 1981 [DE] Fed. Rep. of Germany ....... 3120152

[51] Int. Cl.³ .............................................. C04B 41/42
[52] U.S. Cl. .................... 264/60; 16/110 R; 264/63; 264/67; 264/293
[58] Field of Search ..................... 264/63, 67, 293, 60; 16/110 R

[56] References Cited

U.S. PATENT DOCUMENTS 2,765,512  10/1956  Nesbit ................................... 264/63
3,538,571  11/1970  Callahan et al. ....................... 264/67
3,627,861  12/1971  Timke ................................... 264/293

Primary Examiner—James Derrington
Attorney, Agent, or Firm—Schwartz, Jeffery, Schwaab, Mack, Blumenthal & Evans

[57] ABSTRACT

Ceramic flatware handles of hard porcelain, aluminum oxide, silicon carbide or titanium oxide, with a center bore for receiving the tang, wherein the surface of the flatware handle is provided with a press-molded relief pattern. Flatware handles of this type are obtained by mixing the ceramic raw materials with a thermoplastic plasticizing agent and shaping them into blanks at 90° to 150° C. The blanks are then given their surface profile by means of a press molding device and thereafter fired. Such a process is particularly suitable for oval flatware handles and handles having a center bore which is to be equipped with ceramic screw threads.

8 Claims, 1 Drawing Figure

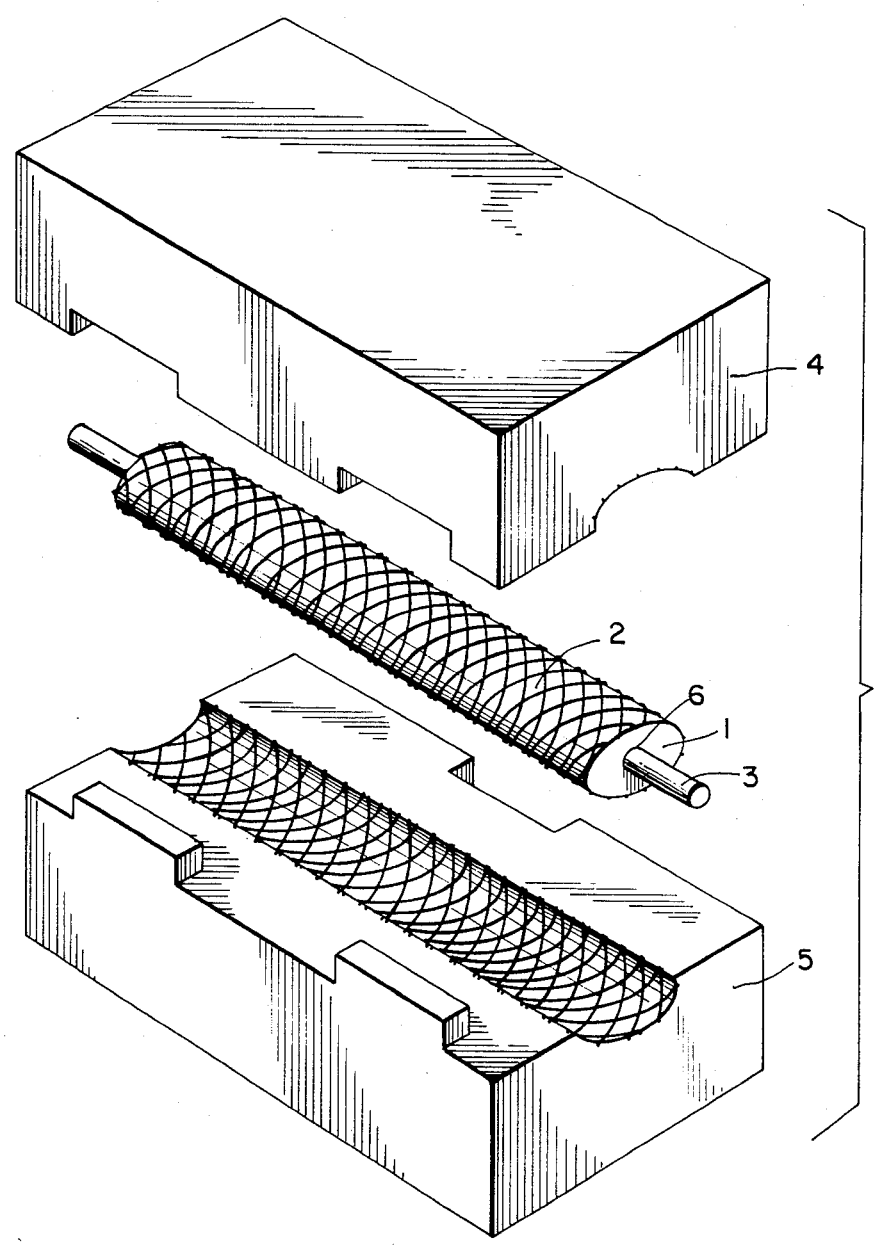

ns. Ceramic flatware handles, for example of hard porcelain, are known. Handles of this type are made mainly by slip casting in plaster molds. However, it is frequently desirable for reasons of design to provide such handles with a specific surface profile. This is generally accomplished by shaping the ceramic mass by means of pressing, rolling with shaped rollers or extrusion, if, as in the latter case, only profiles extending parallel to the longitudinal axis are involved. It is, however, difficult or impossible to produce complex patterns on an oval base by such processes, so that either casting or injection molding must be used. Both of these processes have disadvantages. For example, the number of reproductions possible with plaster molds is limited by their relatively rapid wear, which also involves a deterioration of the accuracy of the surface profile. Injection molding requires very expensive steel molds for the corresponding dies.

DECORATIVE FLATWARE HANDLES AND PROCESS FOR THEIR PREPARATION

BACKGROUND OF THE INVENTION

The present invention relates to ceramic flatware handles with a center bore for receiving the tang. Flatware handles of this type are prepared by shaping a mixture of a ceramic powder and a thermoplastic binder into a blank, heating the organic binders in a preliminary firing and obtaining the ceramic flatware handles in a subsequent sintering process.

SUMMARY OF THE INVENTION

Accordingly, it is the object of the present invention to provide oval flatware handles of the above-described type so that the aforementioned decorative surfaces may be obtained by a simple and economical process.

Another object of the invention is to provide ceramic flatware handles with complex relief patterns on the surface thereof.

An additional object of the invention is to provide ceramic flatware handles with profiled surfaces wherein the profiles may have any orientation.

A further object of the invention is to provide ceramic flatware handles having an oval cross-section and a profiled surface.

It is also an object of the invention to provide a process for forming ceramic flatware handles with profiled surfaces wherein large numbers of high quality reproductions can be obtained from a single forming surface.

Yet another object of the invention is to provide a process for forming ceramic flatware handles with profiled surfaces which can use comparatively inexpensive forming surfaces.

A still further object of the present invention is to provide ceramic flatware handles with center bores which may have various shapes and configurations substantially independent of the external configuration of the handle.

Additionally, it is an object of the present invention to provide a ceramic flatware handle with a threaded internal bore.

The objects of the invention are achieved by providing a ceramic oval flatware handle having a center bore for receiving the tang, wherein the surface of the flatware handle is provided with a pressed relief pattern.

In a further aspect of the invention, the objects are achieved by a process for preparing a ceramic flatware handle, comprising the steps of: forming a mixture of powdered ceramic raw materials, drying the mixture, intermixing the ceramic mass with a thermoplastic plasticizing mixture comprising 12 to 18 weight percent of a binder and 3 to 7 weight percent of a release agent based on the weight of the ceramic mass, shaping the plastic mixture into blanks at a temperature from 90° to 150° C., pressing a relief pattern on the ceramic blanks at a temperature from 60° to 80° C., degassing the binder component at a temperature up to about 300° C., and firing the handle at a temperature from 1350° to 1550° C.

The molded blank may be polished or glazed after firing, or it may be partially or completely metallized. For reasons of mechanical strength, color and decorative appearance, hard porcelain, and particularly aluminum oxide, silicon carbide infiltrated with silicon and titanium dioxide are preferred as the ceramic materials. The relief pattern on the surface of the unfired oval flatware handle is obtained by thermoplastic pressing. The apparatus required for this purpose is comparatively simple.

A simple and economic process for the preparation of such decorative surfaces on oval handles by pressing is effected by thoroughly mixing the ceramic raw materials together in the powder form and drying them, if necessary. Subsequently, 100 parts of the ceramic mass in powder form are mixed with 15 to 25 parts by weight of a thermoplastic plasticizing mixture that is combustible without a residue. Said mixture comprising 12 to 18 parts by weight of a binder and 3 to 7 parts by weight of a release agent. This is followed by shaping the resulting plastic mixture into a blank with an oval cross-section by means of an extruder at 90° to 150° C., whereby the cross-sectional dimensions and the longitudinal bore are determined while taking into consideration the firing shrinkage typical of the material. The blanks are cut into sections of the desired length, pressed in a synthetic plastic die at 60° to 80° C. to form the desired profiled surface, and thereafter immediately ejected. The usual process steps, such as the degassing of the temporary binder at temperatures up to about 300° may then be effected. Deburring of the blanks may be required. The shaped handle may then be fired at a temperature between 1350° and 1550° C. A surface treatment or finish processing may be performed.

The extrusion and the subsequent pressing operations require that the powdered ceramic raw materials be mixed with a plasticizing agent which must satisfy a series of requirements, that cannot all be satisfied simultaneously by the plasticizers known heretofore. The plasticizer determines the extrudability of the ceramic mass and the form stability and mechanical strength of the extruded blank. The plastic properties of the blanks should be rapidly regeneratable after an intermediate storage period, in order to facilitate the pressing process. The plasticizer must not cause adhesion in the press die. Following the final shaping, the plasticizer agents must be removable by firing without leaving a residue and without causing deformation or cracking of the shaped bodies.

The production of the flatware handles according to the invention may be effected by using thermoplastic additive materials comprising 20 to 45 weight percent of a thermoplastic resin material such as polystyrene or polyvinylbutyral with plasticizers, and 55 to 80 weight percent paraffin with various waxes and oils, i.e., paraffinic slip agents. The thermoplastic material serves as a binder to increase hardness, while the second group of components serves principally to facilitate the extrusion. The composition of the second group of components is adjusted to obtain a favorable degassing behavior.

The advantages of the above-described process in comparison to casting in plaster molds lie in the substantial wear resistance of the press mold material. Consequently, very high numbers of pieces can be obtained from a single mold, with a consistent high sharpness of reproduction and surface quality. Furthermore, the center bore for receiving the tang may be round or angular as required, with a diameter of any size, independently of the external profile. In contrast thereto, with the slip casting method generally only castings having a substantially constant wall thickness are obtained, so that the shape of cavity must be very similar to the external configuration.

It is further possible to provide the internal contour with a specific profile, for example with screw threads. This is particularly advantageous in facilitating connection of the ceramic handle with the metal part of the flatware.

Finally, it should be noted that the above-described pressing method is highly suitable for automation. The tools to be used may be activated by manual or automatic press devices. The principles of the invention may also be applied advantageously to multiple molds.

BRIEF DESCRIPTION OF THE DRAWINGS

The invention will now be described in further detail with reference to the accompanying drawing which is a perspective view of a ceramic blank and a pressing apparatus for forming a relief pattern on the blank.

DETAILED DESCRIPTION OF PREFERRED EMBODIMENTS

The press die shown in FIG. 1, consists of an upper part 4 and a lower part 5, and is made of an epoxy resin with a surface of arbitrary configuration, but without undercutting. The diameter of the ceramic blank 1 is larger by approximately 1% than the desired green dimension of the pressed part. After being cut to length the blanks are then preheated in a drying cabinet with the aid of a shaft 3, having a slight clearance in the center bore 6 of the ceramic blank 1. This process requires about 2 hours. The preheated blank is then placed in the press die 4, 5 and with the aid of a ram the relief pattern or profile 2 of the flatware handles is press-formed on the surface of the blank. The blank is thereafter taken from the die 4, 5 by means of the metal shaft 3. Shaft 3 is removed after cooling of the ceramic blank.

The oval flatware handle is obtained by the aforedescribed process, by mixing the ceramic raw materials comprising silicates, oxides and carbides with appropriate additives in a tumbling mill and subsequently drying the milled ceramic material. The resulting extrudable and pressable mass is processed in a heated kneading mixer, wherein the inorganic part of the mixture is intensively intermixed with the molten organic components at the melting temperature of the plastifying material. The cooled mass obtained in this manner is thermoplastically capable of extrusion, i.e., it may be shaped by means of heated extruders into blanks with the desired cross-sectional profile.

Pressing of the extruded blanks cut to length is effected after preheating to 60° to 80° C., whereby the plastic state is regenerated to the extent required for pressing. In order to obtain the desired internal configuration or to produce a definite internal profile such as a screw thread during pressing, a suitable shaft is extended through the center bore of the blanks and removed after pressing and cooling.

Prior to subjecting the molded parts to sintering, a slow degassing firing, adjusted to the melting, evaporation and decomposition points of the individual organic components, is effected to a temperature of approximately 300° C. The process steps following sintering, for example cutting, polishing, metallizing, etc., are of a conventional nature and do not require detailed description.

Further details of the invention will become apparent from a consideration of the following nonlimiting examples.

EXAMPLE 1

The material for the flatware handle comprises 92 weight percent aluminum oxide. The ceramic raw materials are ground in a ball mill with 2.2 weight percent each of soapstone, wollastonite, and kaolin and 1.4 weight percent zirconium, to an average grain size of 2 to 6 μm. After drying by pressing or spray drying, the powder is mixed in a heated kneading mixer with organic additives to form a mixture having the following composition:

81.3 weight percent Al$_2$O$_3$ mass (92%)
5.7 weight percent polyvinylbutyral
5.7 weight percent oleic acid
1.6 weight percent dioctyl phthalate
2.0 weight percent cumaron resin
2.85 weight percent paraffin 60/62
0.85 weight percent hard wax Mixing begins at 130° C. After one hour the temperature is reduced to 100° C., and after 2 hours to approximately 25° C. The originally pasty mixture gradually becomes solid and crumbling with declining temperatures. It is then ready for extrusion. The temperature of the extruder is adjusted to 90° to 110° C. The extruded blanks may be pressed after reheating to 60° to 75° C. The molded parts are degassed by heating slowly at a rate of 2° C. per hour to 300° C., and are thereafter sintered at 1550° C. for 3 hours.

EXAMPLE 2

The material for the flatware handle is silicon carbide infiltrated with silicon. A mixture of 66.7 weight percent SiC with an average grain size of 9 μm, 6.4 weight percent SiC with an average grain size of 3 μm and 6.4 weight percent of phenol formaldehyde resin dissolved in trichloroethylene, is homogenized in a kneading mixer into a viscous paste. The following plasticizing components are subsequently added to the mixture:

6.25 weight percent polyvinylbutyral
6.25 weight percent oleic acid
1.75 weight percent dioctyl phthalate
2.20 weight percent cumaron acid
3.10 weight percent paraffin 60/62
0.95 weight percent hard wax.

The solvent is then evaporated and removed by heating the mass to 130° C. Further mixing and molding operations are as recited in Example 1. Following the degassing of the plasticizer agents, the shaped handle is coked at 1000° C. for 5 hours, whereby the phenolic resin is carbonized. The molded shape then comprises 13 weight percent carbon and 87 weight percent silicon carbide. By reacting the molded shape with silicon at 1600° C. and 1 Torr, a sintered body comprising 84 weight percent SiC and 16 weight percent Si is obtained.

The foregoing embodiments have been described merely to illustrate the invention and are not intended to be limiting. Since modifications of the disclosed embodiments incorporating the spirit and substance of the invention may occur to persons skilled in the art, the scope of the invention is to be limited solely with respect to the appended claims and equivalents.

We claim:

1. A process for preparing a ceramic flatware handle comprising the steps of:
   (a) forming a mixture of powdered ceramic raw materials;
   (b) drying the mixture;
   (c) intermixing the ceramic mass from 15 to 25 weight percent of a thermoplastic plasticizing mixture comprising 12 to 18 weight percent of a binder and 3 to 7 weight percent of a release agent based on the weight of the ceramic mass;
   (d) shaping the resulting plastic mixture into blanks at a temperature from 90° to 150° C;
   (e) pressing a relief pattern on the ceramic blanks at a temperature from 60° to 80° C.;
   (f) degassing the binder component at a temperature up to about 300° C.; and
   (g) firing the handle at a temperature from 1350° to 1550° C.

2. A process according to claim 1, wherein the thermoplastic plasticizing mixture comprises from 20 to 45% by weight thermoplastic resin substances and 55 to 80% by weight paraffinic slip agents.

3. A process according to claim 1, further comprising the step of subjecting the fired ceramic to at least one finishing treatment selected from the group consisting of polishing, glazing and metallizing.

4. A process according to claim 1, wherein said blank is provided with an internal bore and said bore is supported during the pressing step by insertion of a shaft therein.

5. A process according to claim 1 wherein said ceramic mass comprises hard porcelain.

6. A process according to claim 1, wherein said ceramic comprises from 92 to 99.5 weight percent alumium oxide.

7. A process according to claim 1, wherein said ceramic mass comprises silicon carbide infiltrated with silicon.

8. A process according to claim 1, wherein said ceramic mass comprises titanium dioxide.

* * * * *